E. H. VINCENT.
AUTO DUMPING TRUCK.
APPLICATION FILED JUNE 20, 1911.

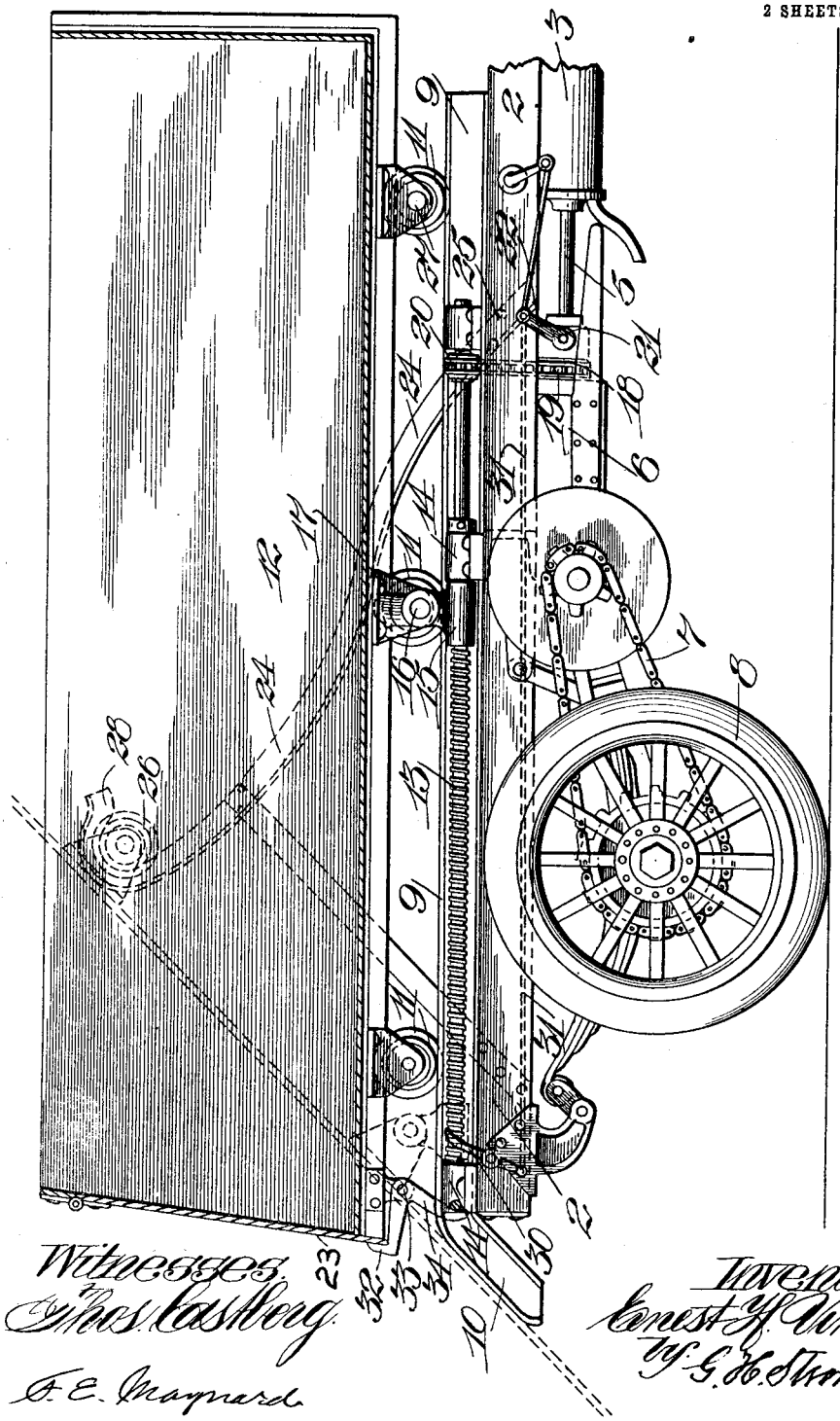

1,077,570.

Patented Nov. 4, 1913.

2 SHEETS—SHEET 2.

Witnesses:
Thos. Crosberg
G. E. Maynard

Inventor:
Ernest H. Vincent
by G. H. Strong
his Atty

UNITED STATES PATENT OFFICE.

ERNEST HENRY VINCENT, OF EMERYVILLE, CALIFORNIA.

AUTO DUMPING-TRUCK.

1,077,570.  Specification of Letters Patent.   Patented Nov. 4, 1913.

Application filed June 20, 1911. Serial No. 634,324.

*To all whom it may concern:*

Be it known that I, ERNEST HENRY VINCENT, a citizen of the United States, residing at Emeryville, in the county of Alameda and State of California, have invented new and useful Improvements in Auto Dumping-Trucks, of which the following is a specification.

This invention relates to dumping trucks, and particularly to motor propelled trucks.

The object of the present invention is to provide a motor propelled, self-dumping truck which is substantial, powerful and durable; and to provide in combination with a motor driven frame a tipping body actuated by a power driven mechanism; and to provide means for automatically disconnecting the driving mechanism from the dumping mechanism.

The invention consists of the parts and the combination and construction of parts hereinafter more fully described and claimed having reference to the accompanying drawings, in which:—

Figure 3:
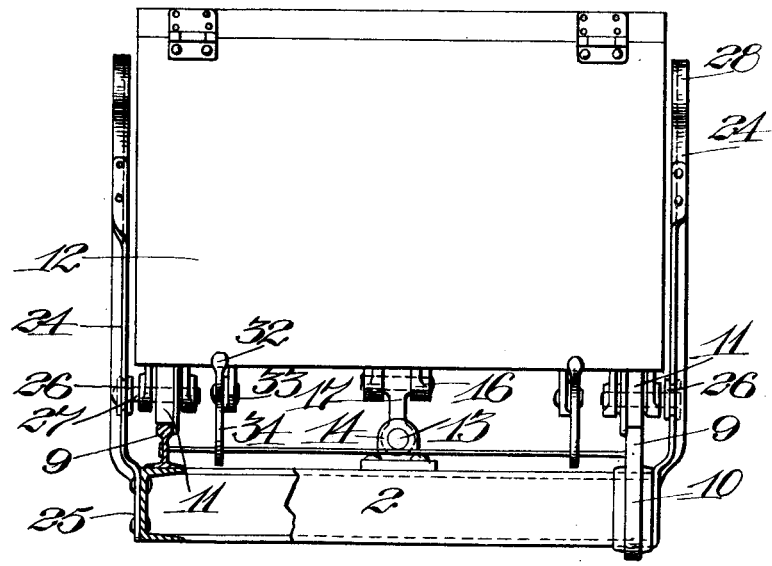
Figure 2:
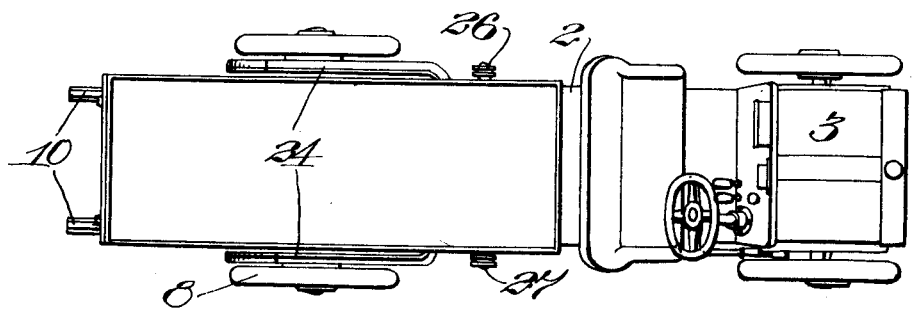

Figure 1 is a side elevation in partial section of the rear portion of the truck frame and the dumping body. Fig. 2 is a plan view of the truck and body. Fig. 3 is an end view of the body portion.

It is my purpose to provide an auto truck embodying a tipping or dumping body adapted to be actuated by a power driven mechanism so that it may be discharged of a full load at one operation, or may be discharged in fractions of a load, as the work in hand may require. To accomplish this purpose I employ a substantial frame 2, upon which is mounted a driving motor 3, by which power is transmitted by a shaft 5 to a transmission gearing indicated at 6, thence by suitable driving connections 7 to propel the driving wheels 8.

Mounted upon and suitably attached to the truck frame 2 are appropriate tracks or rails 9, extending from approximately the center of the frame 2 to the rear and bending slightly downward, as at 10, at their ends.

Upon the rails 9 travel bearing wheels 11, of which there are three on each side of a car or body 12, adapted to contain substance to be transported and discharged at diverse places. The tiltable receptacle or body 12 is longitudinally movable backwardly and forwardly over the rails 9 by appropriate mechanism, here indicated as a screw-shaft or worm 13, mounted in appropriate bearings 14, and being embraced by a threaded traveler or nut 15, which is pivotally connected, as by a pivot 16 to a bracket 17 secured to the bottom of the tiltable receptacle 12.

Power is derived from the engine shaft 5 and transmitted to the worm 13 by a suitable transmission device comprising a gear 18 mounted on the engine shaft, over which may run a belt or chain 19 driving a gear 20 secured to the worm shaft 13. The gear 18 may be loosely mounted upon the shaft 5 and be operatively connected thereto by a suitable form of clutch 21 which is shifted into driving relation with the gear 18 by a lever 22.

In operation, when the loaded receptacle or body 12 is to be tilted over the frame 2 of the truck, the clutch 21 is thrown into driving engagement with the gear 18, thus transmitting power to and revolving the worm 13, which in turn causes the traveler 15 to move rearwardly so that the rearmost wheels 11 of the receptacle 12 will ride over the ends of the rails at 10, while the central bearing wheels 11 continue to move rearwardly upon the rails 9. Meanwhile the front end of the truck begins to lift from the tracks 9 as the rear end, which is provided with a suitable gate or closure 23, descends.

In order to cause the tilting of the receptacle 12 to be regular in its movement and to positively cause the rear end to descend at each rearward motion of the receptacle, and to relieve strain on the screw and body, I provide cam tracks 24, appropriately fastened as by rivets, bolts, or equivalent devices 25 to the truck frame 2. There is one of these cam rails 24 on each side of the truck frame 2 and their curvature or outline is such as to cause the forward end of the receptacle 12 to gradually lift from the rails 9 as the receptacle moves rearwardly. This lifting motion of the forward end of the receptacle 12 is caused by rollers 26 projecting transversely from the sides of the receptacle 12 upon shafts 27 which are vertically above the center of the foremost wheels 11.

As the cam engaging rollers 26 encounter the cams 24, the body or receptacle 12 is lifted at its forward end as the rear end runs down the inclined portions 10 of the tracks 9. As the traveler 15 approaches the rearmost portion of the actuating screw 13 the cam rollers 26 will ultimately be limited in their movement by hook or abutment portions 28 formed at the ends of the cam rails 24. At the time when the cam engaging rollers 26 are limited in their movement by the abutments 28, the body 12 of the truck is designed to stand at such an angle that all of the contents of the receptacle 12 will be discharged therefrom. Then by reversing the direction of rotation of the driving shaft 5 and the actuating worm 13, the traveler 15 advances toward the front of the truck and the receptacle 12 is again brought into its normal horizontal position with all of the bearing wheels 11 resting upon the rails 9.

It will now be seen that the purpose of providing a pivotal connection between the traveler 15 and the tiltable receptacle 12 is to permit the latter to swing pivotally about the traveler 15 as the latter moves toward the end of the truck.

To prevent injury to the apparatus, it is desirable to automatically interrupt the transmission of power to the actuating worm 13, and this is accomplished by a suitable trip or appropriate device indicated as a lever 30, mounted adjacent to the rear end of the truck and adapted to be engaged by the traveler 15 or some other appropriate portion of the dumping mechanism as the tiltable receptacle 12 approaches its rearmost limit. The lever or trip 30 is connected by a link 31 to the clutch operating lever 22, which will be thrown out of operative relation with the gear 18 when the traveler engages the trip 30.

The gate or door 23 of the body 12 may be opened either by hand or appropriate means, and is automatically locked in its closed position when the body is brought to a horizontal relation on the truck 2 by means of a latch 32, pivoted at 33 to the bottom of the body 12; the latch having a depending arm 34 engageable with a suitable or convenient portion of the truck frame 2 when brought into juxtaposition therewith.

Having thus described my invention what I claim and desire to secure by Letters Patent is—

A dumping truck including a wheel support, a pair of parallel longitudinal tracks mounted upon said support, the outer ends of said tracks extending in a downward direction, a body, pairs of rollers carried by said body and cooperating with said tracks, a worm screw rotatably mounted between said tracks, a nut upon said worm screw, a bracket rigidly connected to said body and hinged to said nut, said bracket being located substantially between one pair of said rollers, a pair of cam rails rigidly mounted upon said support, means carried by said body and adapted to coöperate with said cam rails to tilt the body when the same is moved rearwardly upon the tracks, said cam rails being curved in such manner that the tilting of said body takes place about the pintle of said hinge as a center.

In testimony whereof I have hereunto set my hand in the presence of two subscribing witnesses.

ERNEST HENRY VINCENT.

Witnesses:
 JOHN H. HERRING,
 CHAS. EDLLMAN.